(12) United States Patent
Liu et al.

(10) Patent No.: US 8,199,495 B2
(45) Date of Patent: Jun. 12, 2012

(54) FIXING STRUCTURE AND ELECTRONIC DEVICE USING THE SAME

(75) Inventors: Li-Chuan Liu, Taoyuan Shien (TW); Yin-Ting Chen, Taipei (TW); Kun-Ho Lee, Linkou Township (TW); Po-Shen Hsiung, Taipei (TW); Yu-Wen Chen, Xinzhuang (TW); Yin-Wei Yeh, Xinzhuang (TW)

(73) Assignee: Quanta Computer Inc., Taoyuan Shien (TW)

( * ) Notice: Subject to any disclaimer, the term of this patent is extended or adjusted under 35 U.S.C. 154(b) by 375 days.

(21) Appl. No.: 12/656,526

(22) Filed: Feb. 2, 2010

(65) Prior Publication Data
US 2011/0116214 A1    May 19, 2011

(30) Foreign Application Priority Data

Nov. 13, 2009 (TW) .............................. 98221145 U

(51) Int. Cl.
*G06F 1/16* (2006.01)

(52) U.S. Cl. ......... 361/679.58; 361/679.26; 361/679.27; 361/679.57; 24/303

(58) Field of Classification Search .............. 361/679.58
See application file for complete search history.

(56) References Cited

U.S. PATENT DOCUMENTS

| | | | |
|---|---|---|---|
| 6,366,440 B1 * | 4/2002 | Kung .............................. 361/147 |
| 6,653,919 B2 * | 11/2003 | Shih-Chung et al. .......... 335/207 |
| 2007/0133156 A1 * | 6/2007 | Ligtenberg et al. ........... 361/681 |
| 2008/0024964 A1 * | 1/2008 | Lev et al. ...................... 361/681 |
| 2009/0103261 A1 * | 4/2009 | Shih .......................... 361/679.58 |
| 2010/0325844 A1 * | 12/2010 | Fiedler ........................... 24/303 |

* cited by examiner

*Primary Examiner* — Anthony Q Edwards
(74) *Attorney, Agent, or Firm* — Rabin & Berdo, PC

(57) ABSTRACT

A fixing module and an electronic device using the same are provided. The fixing module includes a male housing and a female housing. The male housing disposed in a bottom cover includes a groove, cylinder and a first magnet. The cylinder is slidingly connected to the groove, and the first magnet is disposed in the cylinder. The female housing is disposed in a top cover, including a cavity and a second magnet. The cavity is disposed in correspondence to the cylinder, and the second magnet is fixed in the cavity.

16 Claims, 4 Drawing Sheets

FIXING STRUCTURE AND ELECTRONIC DEVICE USING THE SAME

RELATED APPLICATIONS

This application claims priority to Taiwan Application Serial Number 98221145, filed Nov. 13, 2009, which is herein incorporated by reference.

BACKGROUND

1. Field of Invention

The present invention relates to a fixing module. More particularly, the present invention relates to an electronic device using the fixing module.

2. Description of Related Art

Due to rapid development in information technology, applications on electronic devices have become more complex and are able to do more things. Therefore the electronic devices such as 3G smart phone, personal digital assistants etc. have been frequently used in our daily life to provide increased convenience and efficiency. This not only provides increased convenience and efficiency, but also causes the compression of time and space, where the culture and information exchange is becoming more frequent than ever before so as to achieve the optimal welfare for all mankind.

Accordingly, the electronic product with a folding display could have a rotating function as well in order to supply the consumer with more types of user interfaces and operation mode.

At present, the folding display with the rotating function is mostly used with one pivot joint to exchange the user interfaces and maintain the stability. However, this usually could not supply enough stability for the device and tend to cause the relative displacement in the operation.

SUMMARY

The present invention provides a fixing module and an electronic device using the same, which are used for reducing the relative displacement between the covers when the covers are attached to each other.

The first aspect of the present invention is a fixing module including a male housing and a female housing. The male housing disposed in a bottom cover includes a groove, cylinder and a first magnet. The cylinder is slidingly connected to the groove, and the first magnet is disposed in the cylinder. The female housing is disposed in a top cover, including a cavity and a second magnet. The cavity is disposed in correspondence to the cylinder, and the second magnet is fixed in the cavity, and when the top cover is attached to the bottom cover, a magnetic force between the first magnet and the second magnet induces the cylinder to move forward into the female housing with a displacement, and therefore the cylinder is situated between the top cover and the bottom cover.

According to one embodiment of the present invention, the female housing further includes a spring and a covering element. An end of the spring is connected to the second magnet. The covering element covers an opposite end of the spring, and when the top cover is attached to the bottom cover, the cylinder pushes the covering element such that the spring is compressed correspondingly.

According to another embodiment of the present invention, the female housing further includes a pair of hooks disposed on the sidewall of the cavity to fix the second magnet.

According to another embodiment of the present invention, the groove further includes at least one pair of sliding tracks disposed symmetrically on the sidewall of the groove.

According to another embodiment of the present invention, the cylinder further includes at least a pair of convex elements engaging with the sliding tracks.

According to another embodiment of the present invention, the male housing further includes a sensing element disposed in the groove and used for attracting the first magnet, such that the cylinder gets fixed into the groove when the top cover and the bottom cover are not attached to each other.

The second aspect of the present invention is an electronic device including a top cover, a bottom cover and a fixing module. The top cover includes a covering face and a displaying face disposed opposite to the covering face. The displaying face includes a display disposed at the center of the displaying face and a frame mounted adjacent to the display. The bottom cover is used for being correspondingly attached to the top cover. The fixing module includes a male housing and a first female housing. The male housing is disposed in a bottom cover, and the male housing includes a groove, a cylinder and a first magnet. The cylinder is slidingly connected to the groove and the first magnet is disposed in the cylinder. The first female housing is disposed on the frame of the top cover, and the first female housing includes a first cavity and a second magnet. The first cavity is disposed in correspondence to the cylinder. The second magnet is fixed in the cylinder, and when the displaying face of the top cover is attached to the bottom cover, a magnetic force between the first magnet and the second magnet induces the cylinder to move forward into the female housing with a displacement, and therefore the cylinder is situated between the top cover and the bottom cover.

According to one embodiment of the present invention, the first female housing further includes a first spring and a first covering element. An end of the first spring is connected to the second magnet. The first covering element covers an opposite end of the first spring, and when the top cover is attached to the bottom cover, the cylinder pushes the first covering element such that the spring is compressed correspondingly.

According to another embodiment of the present invention, the first female housing further includes a pair of hooks disposed on a sidewall of the first cavity for fixing the second magnet.

According to another embodiment of the present invention, the groove further includes at least one pair of sliding tracks disposed symmetrically on a sidewall of the groove.

According to another embodiment of the present invention, the cylinder further includes at least a pair of convex elements engaging with the sliding tracks to prevent the rotation of the cylinder.

According to another embodiment of the present invention, the male housing further includes a sensing element disposed in the groove and used for attracting the first magnet, such that the cylinder gets fixed in the groove when the top cover is attached to the bottom cover.

According to another embodiment of the present invention, the electronic device further includes a pivot joint unit used for pivoting the top cover and the bottom cover such that the top cover has a rotary degree of freedom relative to the bottom cover.

According to another embodiment of the present invention, the fixing module further includes a second female housing disposed on the covering face of the top cover, and the first female housing and the second female housing are symmetrical to each other with respect to the top cover. The second female housing includes a second cavity and a third magnet fixed in the second cavity.

According to another embodiment of the present invention, the second female housing further includes a second spring and a second covering element. An end of the second spring is connected to the third magnet. The second covering element covers an opposite end of the second spring, and when the top cover is attached to the bottom cover, the cylinder pushes the second covering element such that the second spring is compressed correspondingly.

According to another embodiment of the present invention, the second female housing further includes a pair of hooks disposed on a sidewall of the second cavity for fixing the third magnet.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
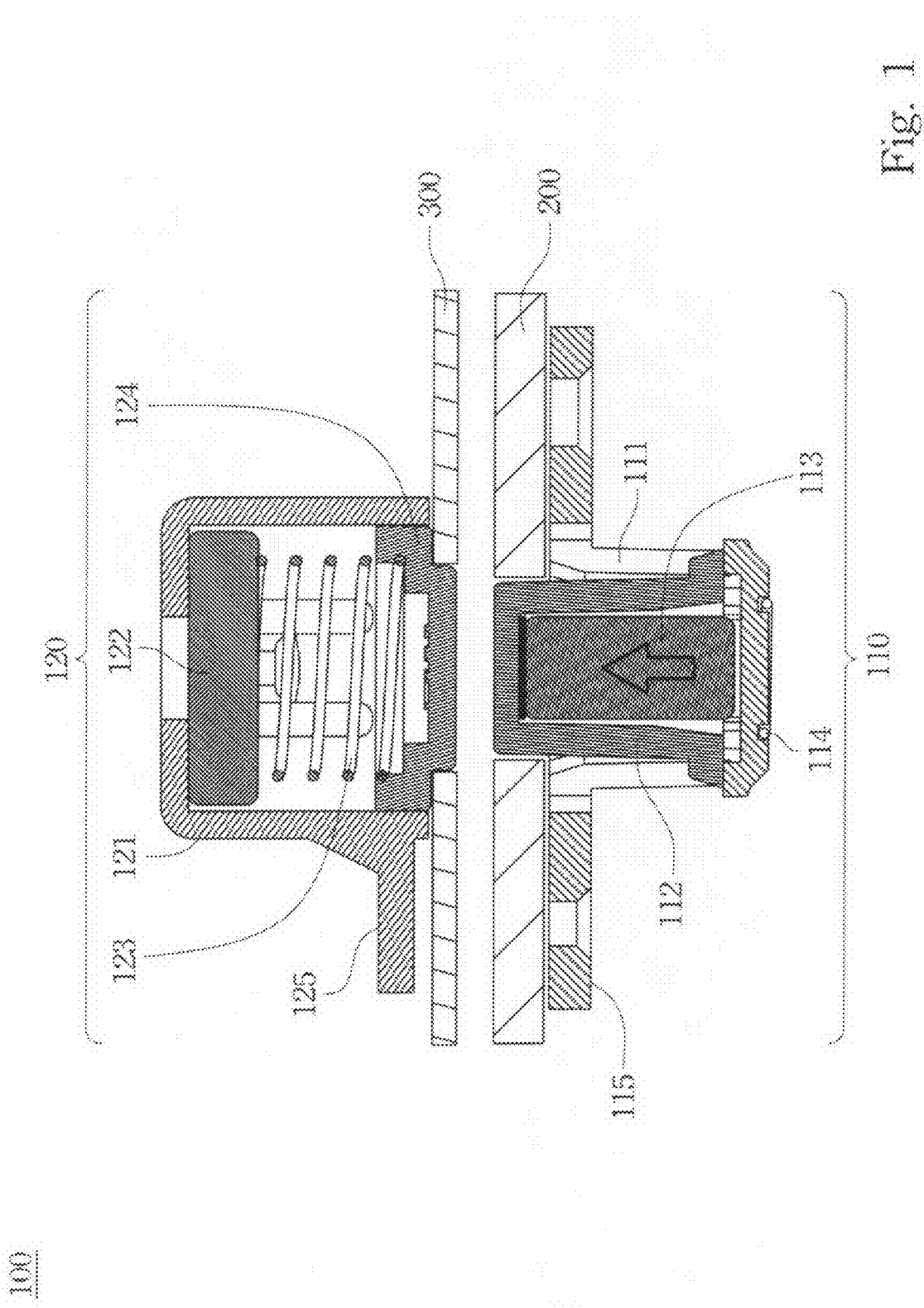
FIG. 1 is a cross-sectional view of a fixing module according to an embodiment of the present invention.

FIG. 1 is a cross-sectional view of a fixing module according to an embodiment of the present invention. A fixing module 100 includes a male housing 110 and a female housing 120. The male housing 110 disposed in a bottom cover 200 includes a groove 111, cylinder 112 and a first magnet 113. The cylinder 112 is slidingly connected to the groove 111, and the first magnet 113 is disposed in the cylinder 112. The female housing 120 is disposed in a top cover 300 and includes a cavity 121 and a second magnet 122. The cavity 121 is disposed in correspondence to the cylinder 112, and the second magnet 122 is fixed in the cavity 121, and when the top cover 300 is attached to the bottom cover 200, a magnetic force between the first magnet 113 and the second magnet 122 induces the cylinder 112 to move forward into the female housing 120 with a displacement, and therefore the cylinder 112 is situated between the top cover 300 and the bottom cover 200.

More specifically speaking, when the top cover 300 is attached to the bottom cover 200, due to the mutual magnetic force between the first magnet 113 and the second magnet 122, the cylinder 112 would be induced to move in direction to the cavity 121 of the female housing 120 (as shown in the FIG. 1) and be simultaneously stuck between the male housing 110 and the female housing 120 so as to have the top cover 300 and the bottom cover 200 fixed to each other more effectively.

Referring to FIG. 1, the female housing 120 further includes a spring 123 and a covering element 124. An end of the spring 123 is connected to the second magnet 122. The covering element 124 covers an opposite end of the spring 123, and when the top cover 300 is attached to the bottom cover 200, the cylinder 112 pushes the covering element 124 such that the spring 123 is compressed correspondingly.

Consequently, as the top cover 300 is lifted away from the bottom cover 200 with a certain distance, and namely the mutual magnetic force between the first magnet 113 and the second magnet 122 is less than the elastic force which the spring 123 imposes on the covering element 124, the spring 123 would return back to its own original length, and therefore the covering element 124 would be reset to the original position.

In another embodiment of the present invention, the groove 111 of the male housing 110 further includes a sensing element 114 disposed in the groove 111 and used for attracting the first magnet 113, such that the cylinder 112 gets fixed in the groove 111 when the top cover 300 and the bottom cover 200 are not attached to each other. Consequently, as the top cover 300 is lift away from the bottom cover 200, the mutual attractive force between the first magnet 113 and the sensing element 114 induces the cylinder 112 to slip into the groove 111 and be firmly fixed into it. Furthermore, the sensing element 114 could be an iron wire, magnet or electric magnet, etc, so as to attract the first magnet 113.

Furthermore, as shown in FIG. 1, the male housing 110 and female housing 120 have a fixing part 115 and a fixing part 125 respectively, which are disposed circularly around the groove 111 and the cavity 121 so as to have the groove 111 and the cavity 121 fixed to the bottom cover 200 and the top cover 300.

Figure 2:
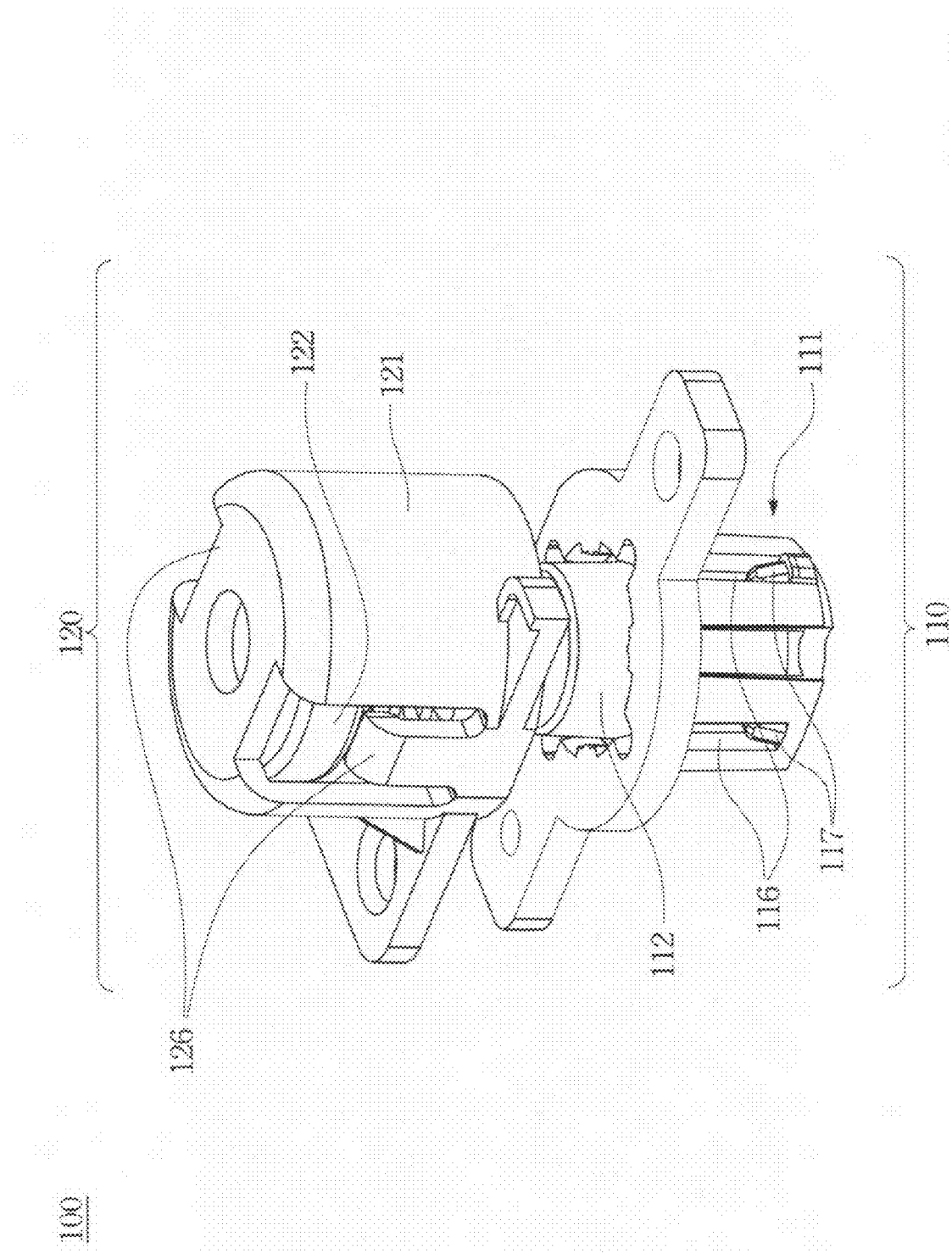
FIG. 2 is a three-dimensional drawing of the female housing and the male housing in the FIG. 1.

FIG. 2 is a three-dimensional drawing of the female housing 120 and the male housing 110 in the FIG. 1. As shown in the FIG. 2, according to another embodiment of the present invention, the female housing 120 includes a pair of the hooks 126 disposed on the sidewall of the cavity 121 for fixing the second magnet 122. The groove 111 further includes at least one pair of sliding tracks 116 disposed symmetrically on the sidewall of the groove 111. The cylinder 112 further includes at least a pair of convex elements 117 engaging with the sliding tracks 116 so as to prevent the rotation while the cylinder 112 is moving through the male housing 110 and the female housing 120.

Figure 3:
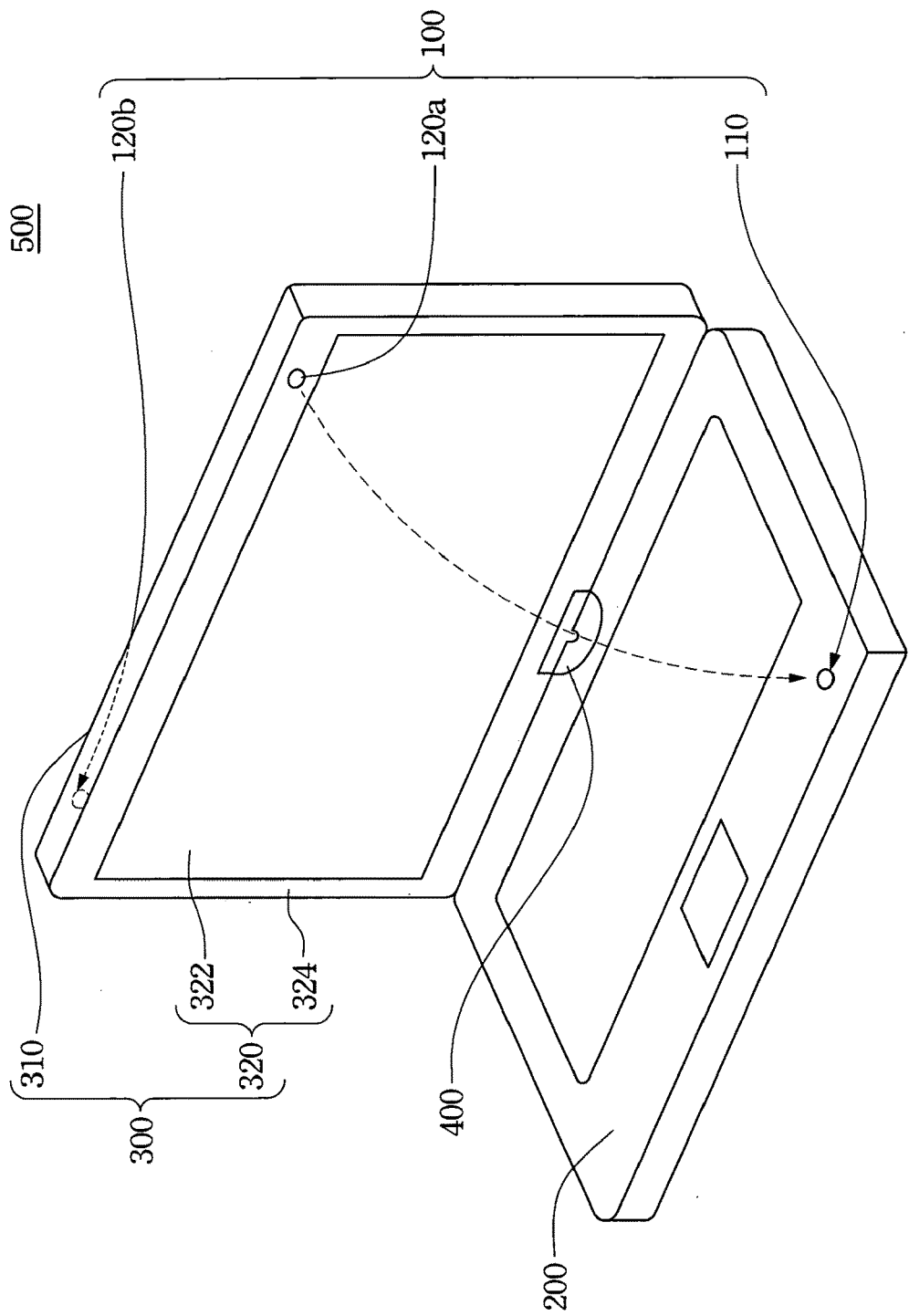
FIG. 3 is a three-dimensional drawing of an electrical device.

FIG. 3 is a three-dimensional drawing of an electrical device. An electrical device 500 includes a top cover 300, bottom cover 200 and a fixing module 100. The top cover 300 includes a covering face 310 and a displaying face 320 disposed opposite to the covering face 310. The displaying face 320 includes a display 322 disposed at the center of the displaying face 320 and a frame 324 mounted adjacent to the display 322. The bottom cover 200 is used for being correspondingly attached to the top cover 300. The fixing module 100 includes a male housing 110 and a first female housing 120a. The male housing 110 is disposed in a bottom cover 200, and the first female housing 120a is disposed in the frame 324 of the top cover 300. Furthermore, as the top cover 300 is attached to the bottom cover 200, the first female housing 120a corresponds to the male housing 110. Due to the related elements and operation are fully disclosed above with the detailed description and the corresponding figures, there are no more words to repeat again.

Specifically speaking, when the top cover 300 of the electrical device 500 is attached to the bottom cover 200, with the use of the operation between the male housing 100 and the first female housing 120a in the fixing module 100, the top cover 300 could automatically be fixed to the bottom cover 200 in order to prevent the relative displacement. Additionally, when the top cover 300 of the electrical device 500 is lifted away from the bottom cover 200 with a certain distance, the fixing module 100 would automatically stop the fixing operation between the male housing 110 and the female housing 120a, and the associated element would return to the original position so as to increase the integration of the user interface and enhance the appearance of the shell.

Referring to FIG. 3, the electrical device 500 further includes a pivot joint unit 400 used for pivoting the top cover 300 and the bottom cover 200 such that the top cover 300 has a rotary degree of freedom relative to the bottom cover. Moreover, the electrical device 500 further includes a second female housing 120b disposed on the covering face 310 of the top cover 300, and the first female housing 120a and the second female housing 120b are symmetrical to each other with respect to the top cover 300.

Figure 4:
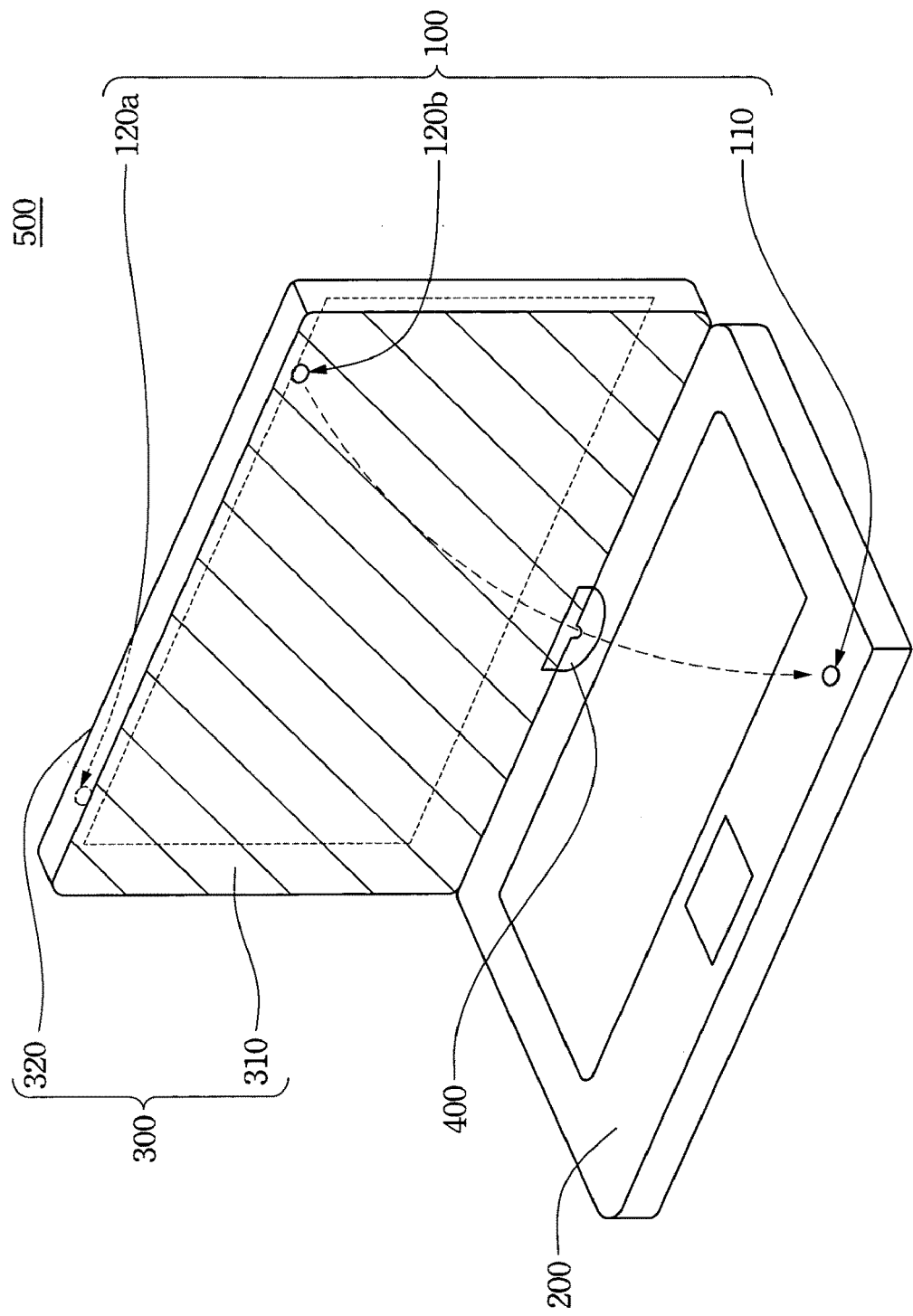
FIG. 4 is a three-dimensional drawing of the top cover in the FIG. 3 after rotated 180 degrees.

Referring to FIG. 4, FIG. 4 is a three-dimensional drawing of the top cover 300 in the FIG. 3 after rotated 180 degrees. Concretely speaking, when the top cover 300 is attached to the bottom cover 200 and simultaneously the display 320 is exposed outside the electronic device 500, the second female housing 120b of the covering face 310 would spontaneously be locked to the male housing 110 of the bottom cover 200 in order not to cause the relative displacement and the shaking between the top cover 300 and the bottom cover 200. As a result, the electric device 500 not only could provide the user with a more appropriate, stable and friendly user interface, but also could have a much more elegant and delicate appearance design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fixing module comprising:
    a male housing disposed in a bottom cover, wherein the male housing comprises:
        a groove;
        a cylinder slidingly connected to the groove; and
        a first magnet disposed in the cylinder; and
    a female housing disposed in a top cover, wherein the female housing comprises:
        a cavity disposed in correspondence to the cylinder; and
        a second magnet fixed in the cylinder, wherein when the top cover is attached to the bottom cover, a magnetic force between the first magnet and the second magnet induces the cylinder to move forward into the female housing with a displacement, and therefore the cylinder is situated between the top cover and the bottom cover.

2. The fixing module of claim 1, wherein the female housing further comprises:
    a spring having an end connected to the second magnet; and
    a covering element covering an opposite end of the spring, wherein when the top cover is attached to the bottom cover, the cylinder pushes the covering element such that the spring is compressed correspondingly.

3. The fixing module of claim 1, wherein the female housing further comprises:
    a pair of hooks disposed on the sidewall of the cavity for fixing the second magnet.

4. The fixing module of claim 1, wherein the groove further comprises at least one pair of sliding tracks disposed symmetrically on the sidewall of the groove.

5. The fixing module of claim 4, wherein the cylinder further comprises at least a pair of convex elements engaging with the sliding tracks.

6. The fixing module of claim 1, wherein the male housing further comprises a sensing element disposed in the groove and used for attracting the first magnet, such that the cylinder gets fixed in the groove when the top cover and the bottom cover are not attached to each other.

7. An electronic device comprising:
    a top cover comprising:
        a covering face;
        a displaying face disposed opposite to the covering face, wherein the displaying face comprises:
            a display disposed at the center of the displaying face; and
            a frame mounted adjacent to the display;
    a bottom cover for being correspondingly attached to the top cover; and
    a fixing module comprising:
        a male housing disposed in a bottom cover, wherein the male housing comprises:
            a groove;
            a cylinder slidingly connected to the groove; and
            a first magnet disposed in the cylinder; and
        a first female housing disposed on the frame of the top cover, wherein the first female housing comprises:
            a first cavity disposed in correspondence to the cylinder; and
            a second magnet fixed in the cylinder, wherein when the displaying face of the top cover is attached to the bottom cover, a magnetic force between the first magnet and the second magnet induces the cylinder to move forward into the female housing with a displacement, and therefore the cylinder is situated between the top cover and the bottom cover.

8. The electronic device of claim 7, wherein the first female housing further comprises:
    a first spring having an end connected to the second magnet; and
    a first covering element covering an opposite end of the first spring, wherein when the top cover is attached to the bottom cover, the cylinder pushes the first covering element such that the spring is compressed correspondingly.

9. The electronic device of claim 7, wherein the first female housing further comprises:
    a pair of hooks disposed on a sidewall of the first cavity for fixing the second magnet.

10. The electronic device of claim 7, wherein the groove further comprises at least one pair of sliding tracks disposed symmetrically on a sidewall of the groove.

11. The electronic device of claim 10, wherein the cylinder further comprises at least a pair of convex elements engaging with the sliding tracks to prevent rotation of the cylinder.

12. The electronic device of claim 7, wherein the male housing further comprises a sensing element disposed in the groove and used for attracting the first magnet, such that the cylinder gets fixed in the groove when the top cover is attached to the bottom cover.

13. The electronic device of claim 7, further comprising:
a pivot joint unit for pivoting the top cover and the bottom cover such that the top cover has a rotary degree of freedom relative to the bottom cover.

14. The electronic device of claim 13, wherein the fixing module further comprises:
a second female housing disposed on the covering face of the top cover, wherein the first female housing and the second female housing are symmetrical to each other with respect to the top cover, the second female housing comprising:
a second cavity; and
a third magnet fixed in the second cavity.

15. The electronic device of claim 14, wherein the second female housing further comprises:
a second spring having an end connected to the third magnet; and
a second covering element covering an opposite end of the second spring, wherein the cylinder pushes the second covering element such that the second spring is compressed correspondingly when the top cover is attached to the bottom cover.

16. The electronic device of claim 14, wherein the second female housing further comprises:
a pair of hooks disposed on a sidewall of the second cavity for fixing the third magnet.

* * * * *